US012730075B2

(12) United States Patent
Park et al.

(10) Patent No.: US 12,730,075 B2
(45) Date of Patent: Sep. 8, 2026

(54) HUMIDITY-SENSING STRUCTURAL COLOR EMITTING LAMINATE AND STRUCTURAL COLOR DISPLAY DEVICE SELF-POWERED BY TRIBOELECTRICITY INCLUDING THE SAME LAMINATE

(71) Applicant: UIF (University Industry Foundation), Yonsei University, Seoul (KR)

(72) Inventors: Cheolmin Park, Seoul (KR); Taebin Kim, Seoul (KR); Jae Won Lee, Seoul (KR)

(73) Assignee: UNIVERSITY INDUSTRY FOUNDATION, YONSEI UNIVERSITY, Seoul (KR)

(*) Notice: Subject to any disclaimer, the term of this patent is extended or adjusted under 35 U.S.C. 154(b) by 968 days.

(21) Appl. No.: 17/987,764

(22) Filed: Nov. 15, 2022

(65) Prior Publication Data

US 2023/0184687 A1 Jun. 15, 2023

(30) Foreign Application Priority Data

Nov. 15, 2021 (KR) ........................ 10-2021-0156672

(51) Int. Cl.

| | |
|---|---|
| ***G01N 21/81*** | (2006.01) |
| ***C08F 293/00*** | (2006.01) |
| ***C09K 11/06*** | (2006.01) |
| ***H02N 1/04*** | (2006.01) |
| ***H05B 33/14*** | (2006.01) |
| ***H05B 33/26*** | (2006.01) |

(52) U.S. Cl.

CPC ......... *G01N 21/81* (2013.01); *C08F 293/005* (2013.01); *C09K 11/06* (2013.01); *H02N 1/04* (2013.01); *H05B 33/145* (2013.01); *H05B 33/26* (2013.01); *C09K 2211/1425* (2013.01); *C09K 2211/1466* (2013.01)

(58) Field of Classification Search

CPC .......... G01N 21/81; G01N 2021/7723; G01N 2021/7773; G01N 2021/7779; C08F 293/005; C09K 11/06; C09K 2211/1425; C09K 2211/1466; H02N 1/04; H05B 33/145; H05B 33/26

USPC ......... 422/400, 420, 421, 424, 82.05, 82.09; 436/164, 165, 169, 170

See application file for complete search history.

(56) References Cited

U.S. PATENT DOCUMENTS

| | | | | |
|---|---|---|---|---|
| 10,203,581 | B2 * | 2/2019 | Park | G02F 1/15165 |
| 2020/0255565 | A1 * | 8/2020 | Jung | C08F 212/12 |

OTHER PUBLICATIONS

Kang et al. Science Advances, vol. 6, Jul. 22, 2020, pp. 1-10.*

(Continued)

*Primary Examiner* — Maureen Wallenhorst

(74) *Attorney, Agent, or Firm* — Foley & Lardner LLP

(57) ABSTRACT

The present invention relates to a humidity-sensing structural color emitting laminate and a structural color display device self-powered by triboelectricity including the same, and more specifically to a structural color display device self-powered by triboelectricity, which can directly sense humidity among human body signals and display the same in structural color immediately without a separate power source and without data processing, and a humidity-sensing structural color emitting laminate for implementing the same.

9 Claims, 7 Drawing Sheets

(56) References Cited

OTHER PUBLICATIONS

Park et al. ACSNano, vol. 9, No. 12, Oct. 27, 2015, pp. 12158-12167.*
Kang, Y. Macromolecular Research, vol. 20, No. 12, 2012, pp. 1223-1225.*
Kim, Taebin, et al., "Self-powered finger motion-sensing structural color display enabled by block copolymer photonic crystal," Nov. 2021, 12 pages.
Office Action in corresponding Korean Patent Application No. 10-2022-0152691, dated Nov. 15, 2022, 6 pages.

* cited by examiner

HUMIDITY-SENSING STRUCTURAL COLOR EMITTING LAMINATE AND STRUCTURAL COLOR DISPLAY DEVICE SELF-POWERED BY TRIBOELECTRICITY INCLUDING THE SAME LAMINATE

CROSS-REFERENCE TO RELATED APPLICATION

This application claims priority to and the benefit of Korean Patent Application No. 10-2021-0156672, filed on Nov. 15, 2021, the disclosure of which is incorporated herein by reference in its entirety.

TECHNICAL FIELD

The present invention relates to a humidity-sensing structural color emitting laminate and a structural color display device self-powered by triboelectricity including the same, and more specifically to a structural color display device self-powered by triboelectricity, which can directly sense humidity among human body signals and display the same in structural color immediately without a separate power source and without data processing, and a humidity-sensing structural color emitting laminate for implementing the same.

BACKGROUND ART

User interaction displays that enable the visualization of human information such as touch, temperature and humidity are receiving considerable attention as having potential as new human-machine interface technologies for motion sensing, robotics and medical applications. Numerous motion-sensing displays have been developed either by physically combining the sensor and display through a microprocessor or by, merging the sensor and display into a single platform that does not require an information conversion microprocessor.

Most studies have used light emitting diodes and/or electroluminescent components (FETs) for the visualization of various motions such as touch, slide and tap, and have shown that brightness changes depend on the degree of stimulation. However, these devices are limited by the requirement of an external power supply such as a battery, which makes the system bulky and uses energy inefficiently. Color-producing components, such as electrochromic, thermochromic and mechanically chromic components, are alternatives that change color instead of intensity in response to stimuli. However, the effect of such discoloration was insignificant mainly because of the low sensitivity to stimuli.

In order to address these issues, the development of a self-powered motion-sensing display in which the energy harvesting technology is combined with stimuli-sensitive display components that operate over the entire visible range is required.

RELATED ART DOCUMENTS

Patent Documents (Patent Document 0001) KR 10-1984865 (registered on May 27, 2019)

DISCLOSURE

Technical Problem

The present invention has been devised to solve the above-described technical requirements, and the problems to be solved by the present invention are directed to providing a display device which does not require a separate power source because it has a self-generating mechanism inside, particularly as a display device which is capable of performing input and output at the same time without data processing by using a processor using biosignals including humidity.

Technical Solution

In order to solve the above-described technical problems, the present invention provides a humidity-sensing structural color emitting laminate, including a block copolymer including a hydrophilic segment and a hydrophobic segment, wherein the hydrophilic segment forms a photonic crystal to form a hydrophilic layer, and the hydrophobic segment forms a photonic crystal to form a hydrophobic layer distinct from the hydrophilic layer, wherein the photonic crystal further includes an alkali metal salt and a hydrophilic polymer, and the hydrophilic polymer forms an interpenetrate network with the hydrophilic segment, and wherein the hydrophilic layer and the hydrophobic layer are alternately laminated to have a structural color structure by light interference, and when the hydrophilic layer absorbs water, the hydrophilic layer swells such that the structural color changes.

In a preferred exemplary embodiment of the present invention, the hydrophobic segment may be at least one polyolefin block selected from ethylene, polypropylene, polybutene-1, polymethylpentene and polystyrene.

In a preferred exemplary embodiment of the present invention, the hydrophilic segment may be a monomer block formed by polymerization of at least one hydrophilic monomer selected from 2-vinylpyridine, 4-vinylpyridine and polyisoprene.

In a preferred exemplary embodiment of the present invention, the hydrophilic layer and the hydrophobic layer may be alternately laminated one or more times in the laminate, respectively, wherein the thickness of each hydrophilic layer is 100 nm to 120 nm at a relative humidity of 30%, and wherein the thickness of each hydrophobic layer is 20 nm to 40 nm.

In a preferred exemplary embodiment of the present invention, the thickness of the hydrophilic layer may be 150 nm to 180 nm at a relative humidity of 80%.

Further, in order to solve the above-described technical problems, the present invention provides a structural color display device which is self-powered by triboelectricity, including an electrode layer; and the above-described structural color emitting laminate formed on one surface of the electrode layer.

In a preferred exemplary embodiment of the present invention, the electrode layer may be an ionic gel electrode.

In a preferred exemplary embodiment of the present invention, the ionic gel electrode may include an alkali metal salt and a hydrophilic polymer.

In a preferred exemplary embodiment of the present invention, the alkali metal salt and hydrophilic polymer included in the hydrophilic layer may be the same as those included in the ionic gel electrode.

In a preferred exemplary embodiment of the present invention, when incident light is white light in the structural color display device which is self-powered by triboelectricity, a reflection spectrum peak may be formed at 470 nm to 500 nm at a relative humidity of 30%, and a reflection spectrum peak may be formed at 580 nm to 610 nm at a relative humidity of 90%.

In a preferred exemplary embodiment of the present invention, when an open-circuit voltage ($V_{OC}(30)$) and a short-circuit current ($I_{SC}(30)$) at a relative humidity of 30% are compared to an open-circuit voltage ($V_{OC}(80)$) and a short-circuit current ($I_{SC}(80)$) at a relative humidity of 80%, the structural color display device which is self-powered by triboelectricity may satisfy all of Condition Formulas 1) and 2) below:

$$6.8 \leq Voc(30)/Voc(80) \leq 8.6 \quad 1)$$

$$4.8 \leq Isc(30)/Isc(80) \leq 6.4 \quad 2)$$

Advantageous Effects

The structural color display device which is self-powered by triboelectricity according to the present invention can produce electric power without a separate contact-type or non-contact-type power source, and due to the expression of the structural color, it can directly visualize human body signals by sensing the humidity change according to the human body signals without a data processing device.

MODES OF INVENTION

Figure 1:
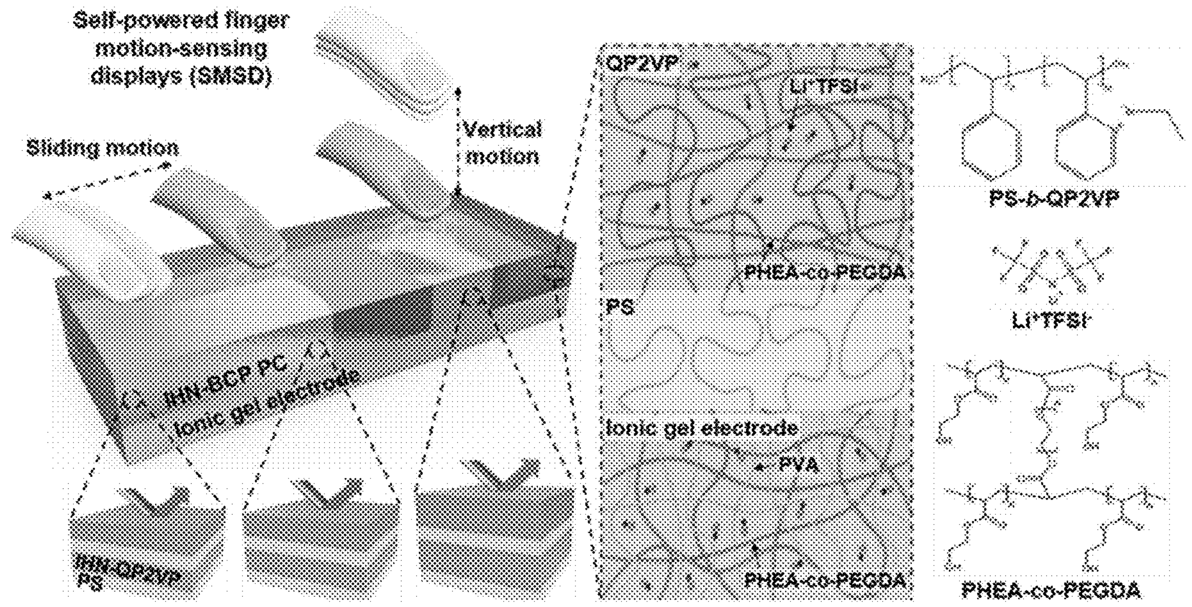
FIG. 1 is a diagram schematically showing the layer structure, structure of each layer and operation principle of the structural color display device self-powered by triboelectricity according to a preferred exemplary embodiment of the present invention.

Prior to the detailed description of the present invention, the meaning of terms used in the specification will be defined.

As used herein, the term "segment" or "block" refers to a unit in which one type of monomer is continuously polymerized in a block copolymer in which two or more types of monomers are linearly bonded in a block form, and it does not mean an isolated form in the block copolymer, but refers only to that part within the block copolymer.

As used herein, the term "photonic crystal" means a crystal whose optical properties change at regular intervals along a crystal lattice.

As used herein, the term "structural color" means a color emitted by the physical structure such as the crystal or atomic arrangement of a material, not the color of the material itself.

As used herein, the term "humidity-sensing structural color emitting laminate" is a multi-layered product, and refers to a product whose structure is changed by the humidity of the surrounding environment and whose structural color can be changed due to the structural change of a photonic crystal.

As used herein, the term "interpenetrate network" means that in a mixture of two or more polymers, polymer chains on both sides are not chemically bonded to each other, but have a structure in which they are physically intertwined.

As used herein, the term "human body information" refers to an input value which is input by a human being by directly moving and acting with respect to an apparatus or device.

As described above, the conventional user-interactive display used for the visualization of human body information in the related art cannot directly visualize human body information, but processes and visualizes data by using a microprocessor and the like, and since a power supply device such as a battery must be provided separately for this purpose, there was a limit to miniaturization of the device.

Accordingly, the present invention has solved these problems and developed a structural color display device which is capable of directly visualizing input human body information without data processing and having a self-generating function such that a separate power supply is not required.

Herein, the structural color display device includes a laminate having a photonic crystal, and the humidity-sensing structural color emitting laminate having a photonic crystal and capable of detecting humidity and expressing a structural color will be described below.

The present invention provides a humidity-sensing structural color emitting laminate, including a block copolymer including a hydrophilic segment and a hydrophobic segment, wherein the hydrophilic segment forms a photonic crystal to form a hydrophilic layer, and the hydrophobic segment forms a photonic crystal to form a hydrophobic layer distinct from the hydrophilic layer, wherein the photonic crystal further includes an alkali metal salt and a hydrophilic polymer, and the hydrophilic polymer forms an interpenetrate network with the hydrophilic segment, and wherein the hydrophilic layer and the hydrophobic layer are alternately laminated to have a structural color structure by light interference, and when the hydrophilic layer absorbs water, the hydrophilic layer swells such that the structural color changes.

The humidity-sensing structure color emitting laminate includes a block copolymer in which a hydrophobic segment, which is a segment of a hydrophobic monomer, and a hydrophilic segment, which is a segment of a hydrophilic monomer, are combined, and the hydrophilic segment forms a self-assembled photonic crystal. In addition, the hydrophobic segment also forms a self-assembled photonic crystal, and the two photonic crystals are layered to form a lamellar structure. These layers are laminated in the in-plane direction of the laminate, and their thickness is extremely thin such that light interference occurs with respect to incident light, thereby showing a structural color. Herein, the fact that the hydrophilic segment and the hydrophobic segment are layered means that in the process of forming a laminate film by curing a solution containing a block copolymer, rather than artificially creating a layer as a separate material, the hydrophilic segment and the hydrophobic segment naturally form photonic crystals, respectively, to be separated in layers, and they still remain bound within the same polymer chain. This is a phenomenon that may appear when the hydrophilic segment and the hydrophobic segment have a volume fraction ratio of about 1:1.

When human body information such as touch or sliding with a hand is input to such a laminate, water from a finger may be absorbed into the laminate, and the absorbed water is only absorbed into the hydrophilic layer. In this case, the hydrophilic layer is swollen and the interval between the layers is changed, and thus, the structural color emitted by the interference is changed.

This is expressed by the relative humidity (RH) of the surrounding environment of the laminate, and when the relative humidity increases, water is absorbed into the hydrophilic layer and the swelling hydrophilic layer becomes thicker such that compared to when the thickness is relatively thin, long-wavelength light becomes dominant in the reflection spectrum.

FIG. 1 is a diagram schematically showing the operating principle and layer structure of the humidity-sensing structure color emitting laminate according to a preferred exemplary embodiment of the present invention. Referring to FIG. 1, it can be seen that although the laminate includes a PS-b-qP2VP (polystyrene-b-quaternized poly(2-vinylpyridine)) block copolymer, the hydrophilic layer is composed of QP2VP segments and the hydrophobic layer is composed of PS layers. It can be seen that the hydrophilic layer includes an alkali metal salt and other hydrophilic polymers together, and the hydrophilic layer and the hydrophobic layer are separated into layers.

Figure 2:
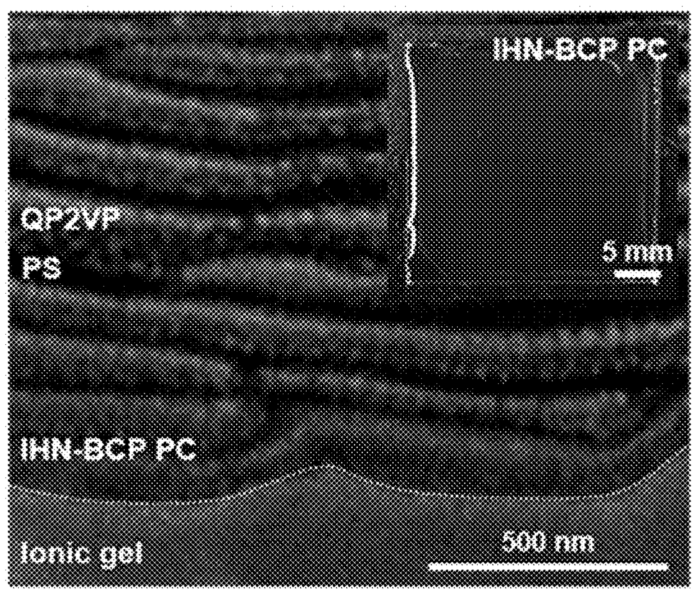
FIG. 2 is an SEM image obtained by photographing the cross-section of the structural color display device self-powered by triboelectricity according to a preferred exemplary embodiment of the present invention, and the upper right corner is an image of the structural color display device showing a blue structural color.

FIG. 2 is a diagram showing the layered structure by taking SEM images of the cross-section of such a laminate. Referring to FIG. 2, it can be seen that the hydrophilic layer of QP2VP and the hydrophobic layer of PS are alternately laminated to form a lamellar structure. As a result of such a layered structure, the structural color is emitted due to light interference, and the appearance of the laminate emitting a blue structural color can be seen in the upper right corner of FIG. 2.

Figure 3:
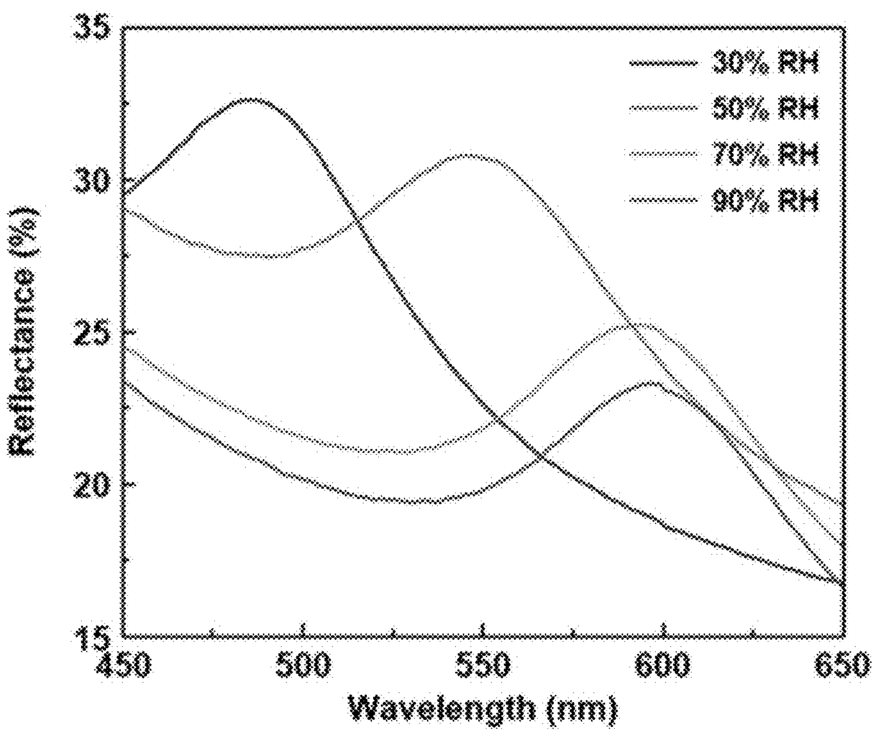
FIG. 3 is a graph comparing the structural color UV-vis spectra according to the relative humidity of the structural color display device self-powered by triboelectricity according to a preferred exemplary embodiment of the present invention at relative humidities (RH) of 30%, 50%, 70% and 90%, respectively.
Figure 4:
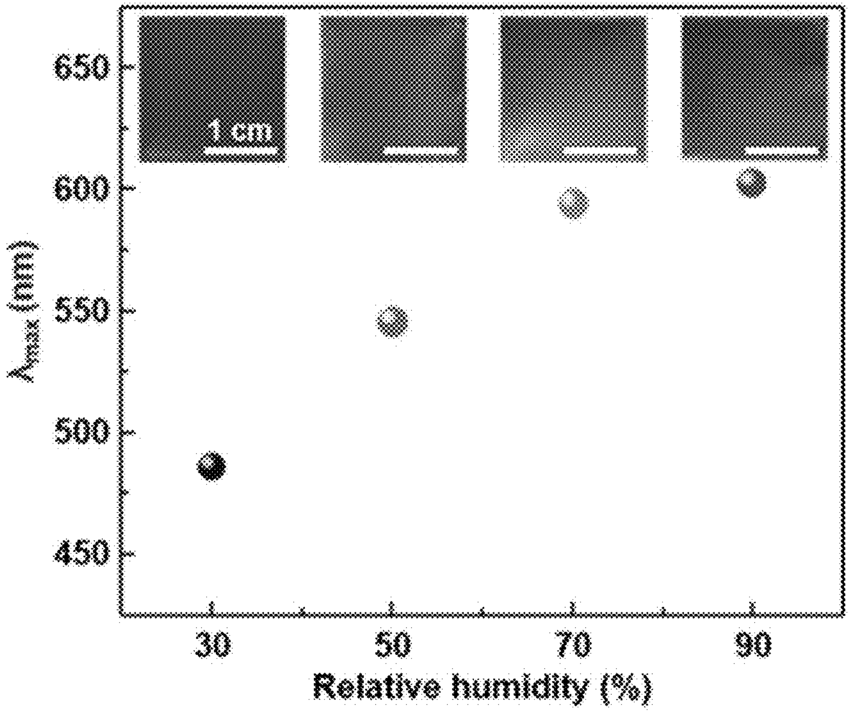
FIG. 4 is a graph illustrating the comparison of wavelengths representing peak values in the spectra of FIG. 3 for each relative humidity.
Figure 5:
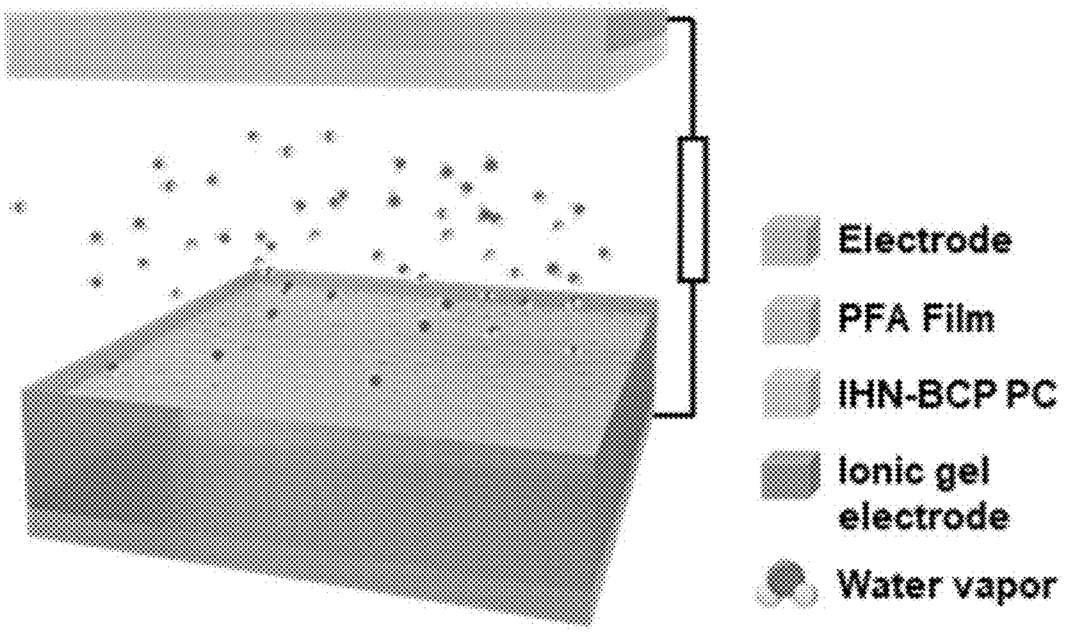
FIG. 5 is a mimetic diagram showing the appearance of the structural color display device self-powered by triboelectricity according to a preferred exemplary embodiment of the present invention under controlled relative humidity.

FIG. 3 shows the UV-vis reflectance spectra of this laminate, and compares the change of the reflectance spectra according to the surrounding relative humidity. Since the peak wavelength moves to the right as the relative humidity increases from 30% to 80%, it can be seen that as the humidity is higher, the reflectance of the long wavelength becomes higher, and it moves toward the red color. Among these, the peak wavelength is shown in FIG. 4, and it can be seen that the same result as the description of FIG. 3 is shown.

Figure 9:
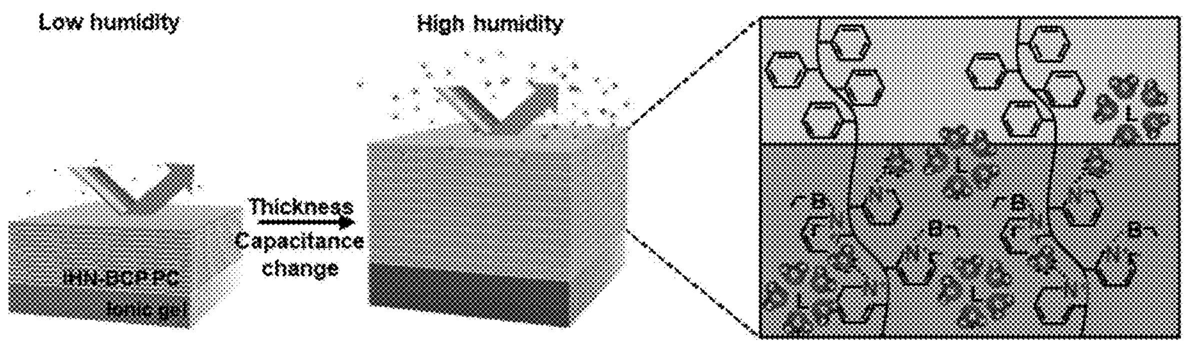
FIG. 9 is a diagram schematically showing the structural color change mechanism according to relative humidity of the structural color display device self-powered by triboelectricity according to a preferred exemplary embodiment of the present invention in a mimetic diagram.
Figure 10A:
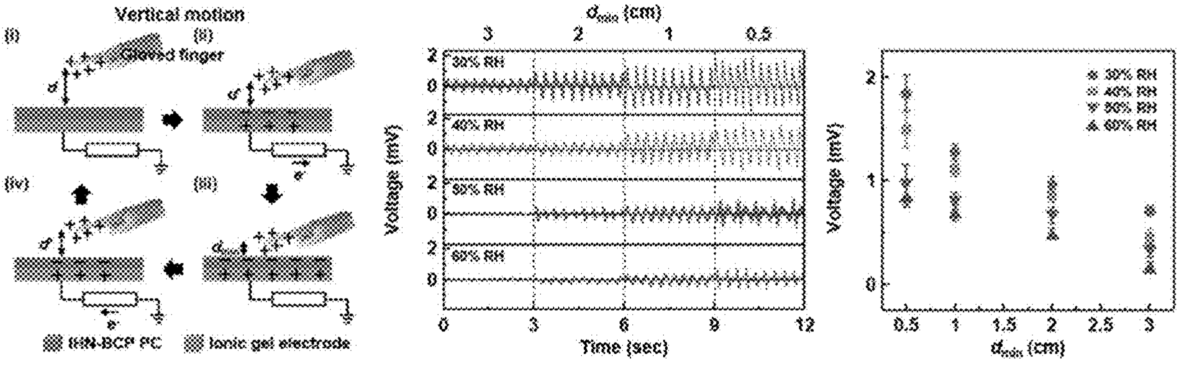
FIG. 10*a* is i) (left) a mimetic diagram showing the operating principle (vertical direction) of the structural color display device self-powered by triboelectricity according to a preferred exemplary embodiment of the present invention in a non-contact mode, and ii) (center) a graph illustrating the comparison of output voltages for each relative humidity according to the $d_{min}$ value, which is the distance between the hand and the display device in the left drawing, and iii) (right) a graph illustrating the comparison of the average voltage peaks compared under the same conditions as the central drawing.
Figure 10B:
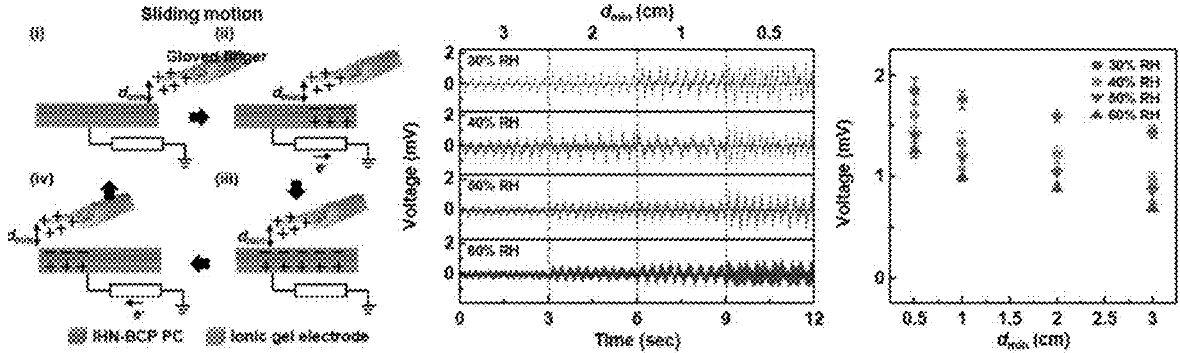
FIG. 10*b* is i) (left) a mimetic diagram showing the operating principle (horizontal direction: sliding) of the structural color display device self-powered by triboelectricity according to a preferred exemplary embodiment of the present invention in a non-contact mode, ii) (center) a graph illustrating the comparison of output voltages for each relative humidity according to the $d_{min}$ value, which is the distance between the hand and the display device in the left drawing, and iii) (right) a graph illustrating the comparison of average voltage peaks compared under the same conditions as the central drawing.

FIG. 9 is a mimetic diagram showing the principle that the structural color of the humidity-sensing structural color emitting laminate according to a preferred exemplary embodiment of the present invention changes according to a change in humidity. Referring to FIG. 9, it can be seen that the laminate to which white light is incident at low humidity reflects blue as a structural color, and after high humidity, the thickness of the hydrophilic layer becomes thicker and the reflected wavelength becomes longer to the red color. In this case, looking at the mimetic diagram on the right showing the appearance of the swollen hydrophilic layer, it can be confirmed that water is absorbed into the hydrophilic layer.

In a preferred exemplary embodiment of the present invention, the hydrophobic segment may be polyolefin, which is at least one polymer selected from ethylene, propylene, polybutene-1, polymethylpentene and polystyrene. However, it is not necessarily limited thereto, and as long as it is hydrophobic, easy to crystallize and does not have an excessively high density such that water can permeate, it is considered as a monomer having properties that meet the purpose of the present invention. The fact that the listed hydrophobic segments are polyolefin means that a block in which the monomers are polymerized in a polymer is composed of a plurality of monomers, but does not mean that a separate polymer is formed.

In a preferred exemplary embodiment of the present invention, the hydrophilic segment may be a monomer block which is formed by polymerization of at least one hydrophilic monomer selected from 2-vinylpyridine, 4-vinylpyridine and polyisoprene. However, it is not necessarily limited thereto.

In a preferred exemplary embodiment of the present invention, the hydrophilic layer and the hydrophobic layer are alternately laminated one or more times in the laminate, respectively, wherein the thickness of each hydrophilic layer is 100 nm to 120 nm at a relative humidity of 30%, and wherein the thickness of each hydrophobic layer is 20 nm to 40 nm.

In particular, the thickness of the hydrophilic layer is important, and if the thickness of the hydrophilic layer is less than 100 nm at a relative humidity of 30%, when the incident light is white light (natural daylight), the reflected wavelength is concentrated on UV, and thus, the color is dark and it is difficult to function as a display device. Conversely, if it is more than 120 nm, the reflected wavelength may become too long and deviate from the visible region when it is swollen due to high humidity, and thus, it is also not appropriate and it is appropriate to adjust within the above range.

The thickness of the hydrophobic layer is also related to the reflected wavelength, and the thickness of the hydrophobic layer does not change regardless of the relative humidity of the surrounding environment. The reflected wavelength spectrum is changed by the thickness difference between the hydrophobic layer and the hydrophilic layer.

In a preferred exemplary embodiment of the present invention, the thickness of the hydrophilic layer may be 150 nm to 180 nm at a relative humidity of 80%.

This is a swollen thickness compared to the thickness at a relative humidity of 30%, and if the thickness at a relative humidity of 80% is less than 150 nm, the structural color change due to humidity change is not large, and thus, the utilization of a practical use may become difficult, and if it is more than 180 nm, it is also not appropriate because the reflection spectrum increases the weight of the non-visible region.

Further, in a preferred exemplary embodiment of the present invention, the thickness of the hydrophilic layer and the thickness of the hydrophobic layer are preferably at a ratio of 3:1 to 5:1 at a relative humidity of 30% and 7:1 to 9:1 at a relative humidity of 80%. Within these ranges, structural color change in the visible light region may be efficiently obtained.

Further, in order to solve the above-described technical problems, the present invention provides a structural color display device which is self-powered by triboelectricity, including an electrode layer; and the above-described structural color emitting laminate formed on one surface of the electrode layer. Therefore, the structural color display device according to the present invention may be utilized as a display and may self-generate as human body information by human contact and the like such that a separate power supply is not required and information is visualized as structural colors, and thus, no data processing device is required and no large power is required. Due to this, it is possible to miniaturize the device.

In a preferred exemplary embodiment of the present invention, the electrode layer may be an ionic gel electrode. In a preferred exemplary embodiment of the present invention, the ionic gel electrode may include an alkali metal salt and a hydrophilic polymer. That is, the structural color display device self-powered by triboelectricity according to a preferred exemplary embodiment of the present invention may be formed by a solution process, in which a layer including an alkali metal salt and a hydrophilic polymer may be cured to form an electrode.

Preferably, the alkali metal salt may be a lithium salt. In addition, the hydrophilic polymer may preferably be at least one polymer selected from $C_1$-$C_6$ linear or branched hydroxyalkyl acrylate-based monomers and methacrylate-based monomers including a hydroxy group as a hydrophilic group, or a copolymer of the monomer and a difunctional acrylate-based or methacrylate-based monomer.

In a preferred exemplary embodiment of the present invention, the hydrophilic layer may include the same alkali metal salt and hydrophilic polymer as those included in the ionic gel electrode. That is, the hydrophilic polymer and the alkali metal salt included in the ionic gel electrode layer-forming solution when manufactured by the solution process may be mixed with the block copolymer of the structural color emitting laminate to be included in the hydrophilic layer.

In the structural color display device self-powered by triboelectricity according to a preferred exemplary embodiment of the present invention, when incident light is white light, a reflection spectrum peak may be formed at 470 nm to 500 nm at a relative humidity of 30%, and a reflection spectrum peak may be formed at 580 nm to 610 nm at a relative humidity of 90%. If the peak of the reflection spectrum has a shorter wavelength than 470 nm at a relative humidity of 30%, this is an excessively short wavelength, resulting in poor visibility and a feeling of fatigue. In addition, if it is more than 500 nm, the peak of the reflection spectrum at high humidity becomes too long and may enter the infrared region, and thus, it is preferable to be within the above ranges. The same applies to the peak wavelength of the reflectance spectrum at a relative humidity of 90%, and when the peak of the reflectance spectrum is less than 580 nm at 90% relative humidity, the peak of the reflectance spectrum at low humidity becomes an excessively short wavelength, resulting in poor visibility, and even if the wavelength is more than 610 nm, there is a problem in that visibility, especially brightness, may be lowered due to an excessively long wavelength.

In a preferred exemplary embodiment of the present invention, when an open-circuit voltage ($V_{OC}(30)$) and a short-circuit current ($I_{SC}(30)$) at a relative humidity of 30% are compared to an open-circuit voltage ($V_{OC}(80)$) and a short-circuit current ($I_{SC}(80)$) at a relative humidity of 80%, the structural color display device which is self-powered by triboelectricity may satisfy all of Condition Formulas 1) and 2) below:

$$6.8 \leq Voc(30)/Voc(80) \leq 8.6 \quad 1)$$

$$4.8 \leq Isc(30)/Isc(80) \leq 6.4 \quad 2)$$

If the high humidity open-circuit voltage value $V_{OC}(80)$ is less than 6.8 times the low humidity open-circuit voltage value $V_{OC}(30)$, or if the high humidity short-circuit current value $I_{SC}(80)$ is less than 4.8 times the low humidity short-circuit current value $I_{SC}(30)$, the difference in structural color at high humidity and low humidity is not large, and thus, practicality is poor, and if it is more than 8.6 times or 6.4 times, respectively, it requires additional driving force.

Hereinafter, the configuration and effects of the present invention will be described in more detail with reference to examples. However, the exemplary embodiments are merely exemplified so that the implementation form of the present invention can be easily practiced, and do not limit the scope of the present invention. Those skilled in the art will understand that even if the present invention is implemented by adding, changing and deleting elements other than the essential elements described in the claims of the present invention, it still falls within the scope of the present invention.

Example 1: Manufacture of Structural Color Display Device Self-Powered by Triboelectricity 1. Reagents Used Polystyrene-block-poly(2-vinylpyridine) (PS-b-P2VP) was synthesized by living anionic polymerization. The number average molecular weight was about 90 kg/mol.

In addition, propylene glycol monomethyl acetate, chloroform, poly(ethylene glycol diacetate) (PEGDA, Mn=700 g/mol), 2-hydroxyethyl acrylate (2-HEA), 2-hydroxy-2-methylpropiophenone, LiTFSI, polyvinyl alcohol, bromoethane and hexane were all purchased from Sigma-Aldrich.

In addition, perfluoroalkoxyalkane (PFA) at a thickness of 25 μm was purchased from Alphaflon.

2. Manufacture of Structural Color Laminate/Ionic Gel Display Device

A PS-b-P2VP solution in a propylene glycol monomethyl acetate solvent was spin-coated on a silicon substrate to prepare a lamella-shaped PS-b-P2VP film having a thickness of about 1 The film was annealed at 60° C. for 24 hours in a chloroform gas atmosphere to prepare a photonic crystal film having a lamellar structure of PS (hydrophobic) layers and P2VP (hydrophilic) layers that were alternately laminated in the plane direction. The P2VP segment was then quaternized by immersing the lamellar photonic crystal film in a 1-bromoethane solution (solvent: hexane) for 24 hours.

A PHEA-co-PEGDA/LiTFSI ionic gel was prepared from an ionic gel solution including PEGDA, 2-HEA, LiTFSI, 2-hydroxy-2-methylpropiophenone and deionized water. In addition, polyvinyl alcohol was added to improve the softness and flexibility of the material.

The ionic gel solution was sprayed onto the surface of the photonic crystal film, and the solution was absorbed into the P2VP layers to sufficiently swell.

Comparative Example 1: Manufacture of Structural Color Display Device Self-Powered by Triboelectricity A structural color laminate and a self-powered structural color display device were manufactured in the same manner as in Example 1, except that the lithium salt and PHEA-co-PEGDA monomer included in the ionic gel solution were directly added to the block copolymer solution without forming an ionic gel film.

Comparative Example 2: Manufacture of Structural Color Display Device Self-Powered by Triboelectricity A self-powered structural color display device was manufactured in the same manner as in Example 1, except that a laminate was formed by using only the photonic crystal block copolymer solution without the ionic gel solution.

Comparative Example 3

For comparison, a triboelectric comparison experiment was performed with only a silicon substrate without forming a structural color laminate.

Experimental Example 1: Measurement of Change in Reflectance Spectra and Structural Color According to Humidity A white light source was applied to the structural color display device self-powered by triboelectricity which was manufactured in Example 1, and the reflected structural color spectrum was analyzed with a spectrophotometer. The relative humidity of the surrounding environment was measured by changing to 30%, 40%, 50%, 60%, 70% and 80%, and the results are shown in FIGS. 3 and 4, respectively.

Referring to FIG. 3, it can be confirmed that as the relative humidity increased, the peak of the reflection spectrum shifted toward a longer wavelength. FIG. 4 shows the wavelength of the peak, and the same result could be confirmed. Through this, it was found that high humidity increases the thickness of the hydrophilic layer of the structural color emitting laminate, and thus causes the structural color reflected by the photonic crystal to move toward the infrared and change to a red color.

Experimental Example 2: Measurements of Open-Circuit Voltage and Short-Circuit Current According to Humidity A 4×4 Cr/Au (1 nm/30 nm thick) electrode was deposited on a 20×20 $cm^2$ polyethylene terephthalate substrate by thermal evaporation through a mask. A 2×2 $cm^2$ IHN-BCP/ionic gel film on a conductive carbon film was attached to the Cr/Au electrode. Data obtained according to the examples and comparative examples were recorded in real time by using an oscilloscope and processed by using the customized OriginPro program (OriginLab Corporation, USA). The results according to Example 1 are illustrated in FIG. 6, and the comparison between Example 1 and the comparative examples is illustrated in FIGS. 7 and 8.

Figure 6:
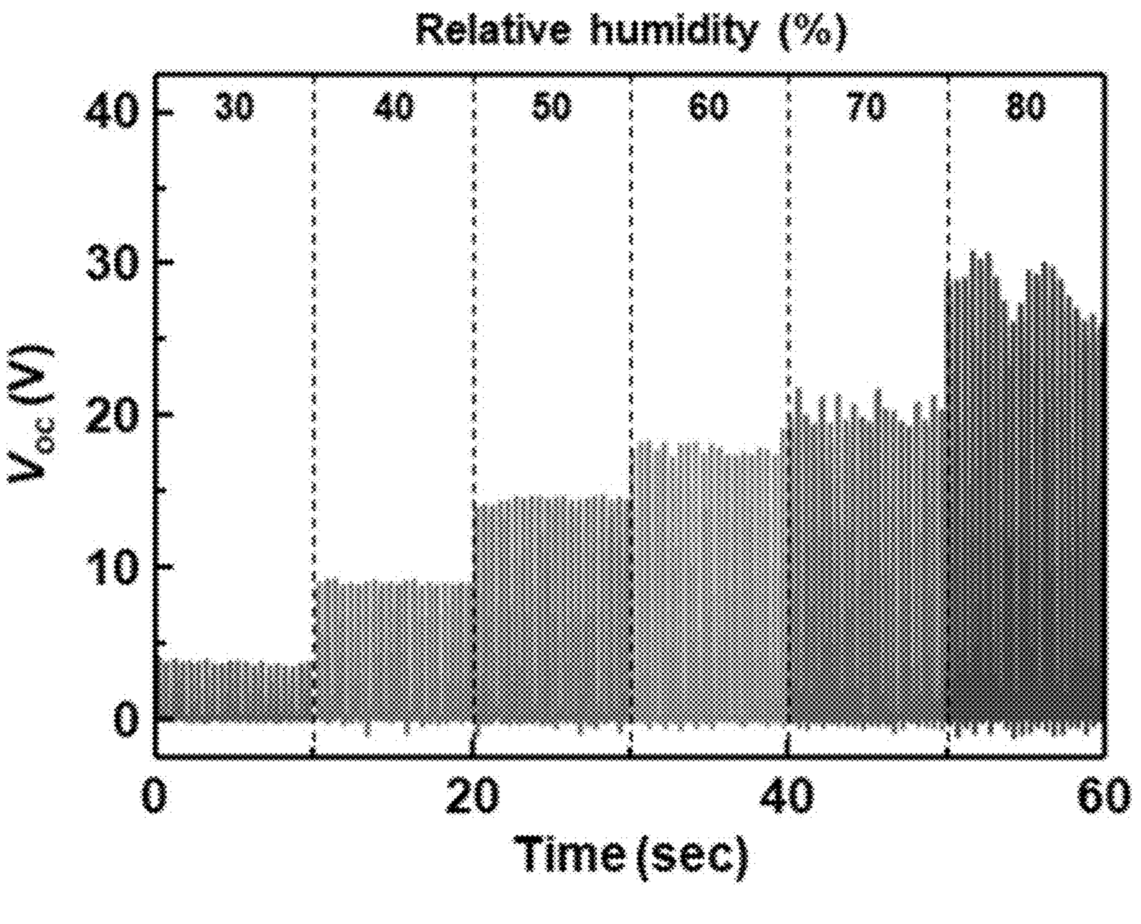
FIG. 6 is a graph showing the open-circuit voltage ($V_{OC}$) of the structural color display device according to an exemplary embodiment of the present invention as a function of relative humidity, and the color of the graph bar is expressed as a structural color appearing at each relative humidity.

Referring to FIG. 6, it can be seen that as the relative humidity increased, the open-circuit voltage increased and the triboelectricity became stronger, and the color of the graph indicates that the structural color changed. As the relative humidity increased, it was confirmed that the long-wavelength colors changed in the order of purple, blue, green, yellow, orange and red.

Figure 7:
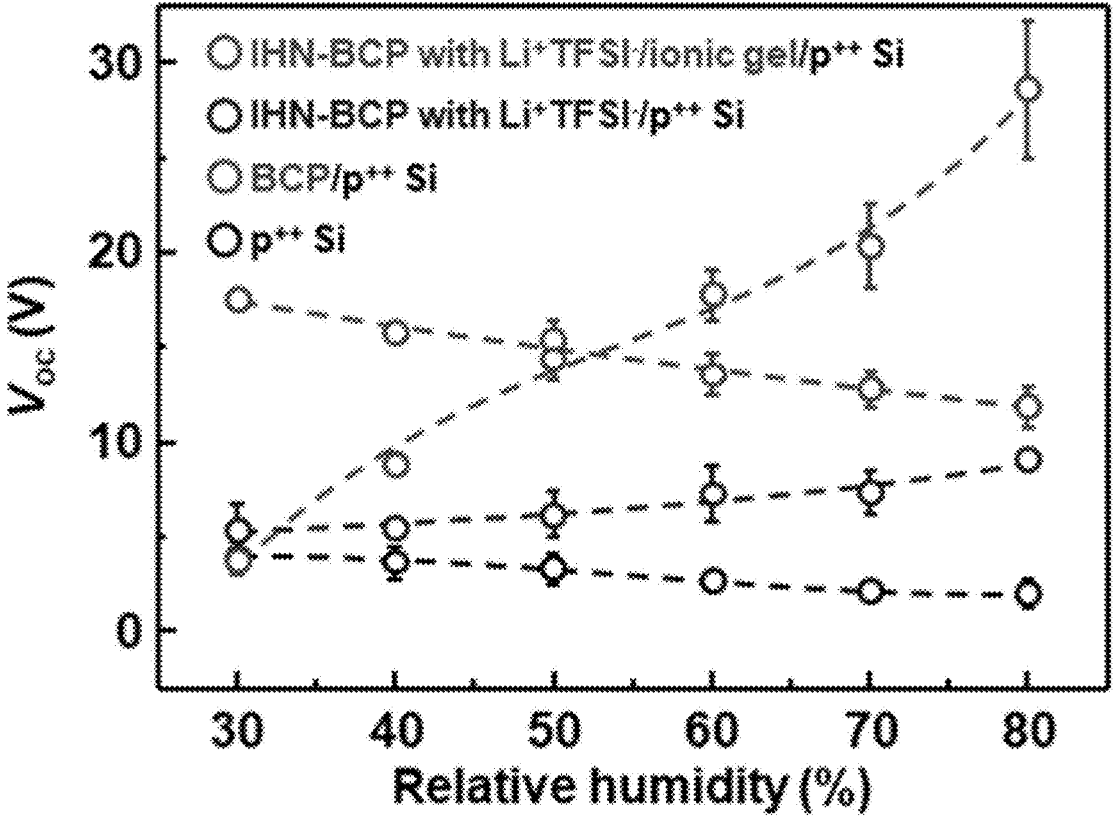
FIG. 7 is a graph illustrating the comparison of open-circuit voltages according to the relative humidity, wherein the open-circuit voltage of the structural color display device self-powered by triboelectricity was i) composed of an interpenetrate network block copolymer photonic crystal (IHN-BCP) layer including LiTFSI salt/ionic gel electrode layer/p++ silicon layer, ii) composed of an IHN-BCP layer including LiTFSI salt/p++ silicon layer without an ionic gel electrode layer, iii) composed of a block copolymer photonic crystal layer/p++ silicon layer without an interpenetrate network, and iv) composed of simple p++ silicon layer.
Figure 8:
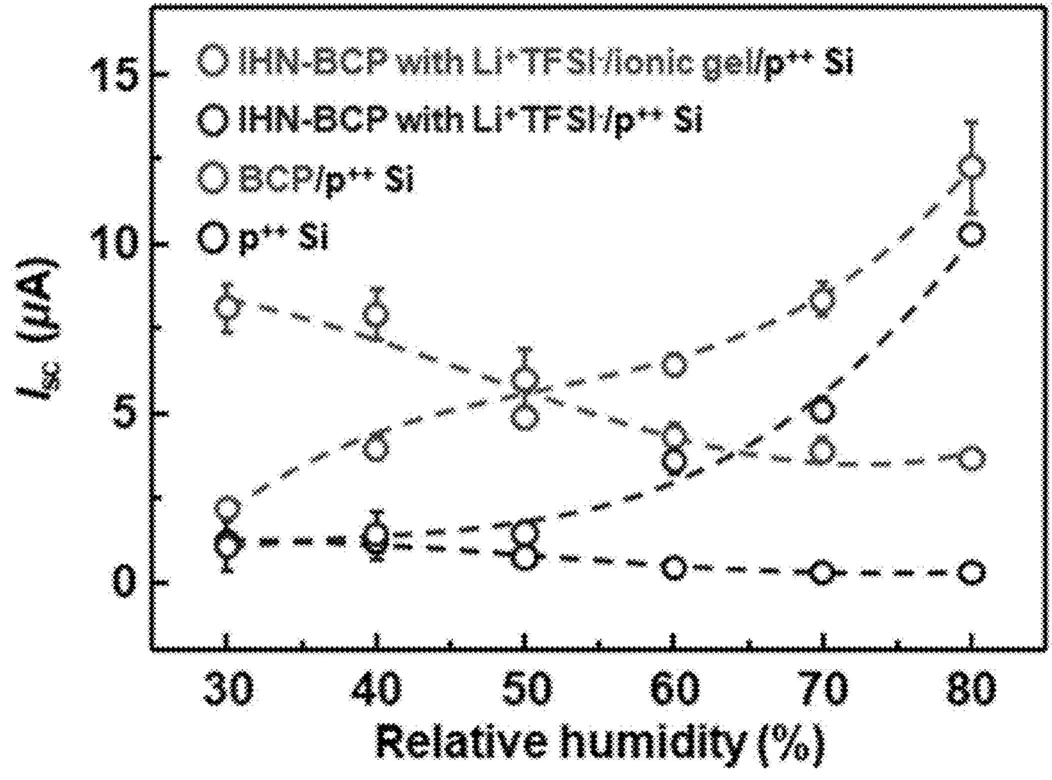
FIG. 8 is a graph illustrating the comparison of short-circuit currents (ISC) under the same conditions as those of FIG. 7.

Referring to FIGS. 7 and 8, it can be seen that the structural color display device of Example 1 including an ionic gel electrode and having a photonic crystal laminate and an interpenetrate network structure had the most excellent open-circuit voltage increase rate according to humidity, and showed the same results for the short-circuit current.

The invention claimed is:

1. A structural color display device which is self-powered by triboelectricity, comprising:

an ionic gel electrode layer; and a humidity-sensing structural color emitting laminate formed on one surface of the electrode layer, wherein the humidity-sensing structural color emitting laminate, comprises:

a block copolymer comprising a hydrophilic segment and a hydrophobic segment, wherein the hydrophilic segment forms a photonic crystal to form a hydrophilic layer, and the hydrophobic segment forms a photonic crystal to form a hydrophobic layer distinct from the hydrophilic layer, wherein the photonic crystal of the hydrophilic layer further comprises an alkali metal salt and a hydrophilic polymer, and the hydrophilic polymer forms an interpenetrate network with the hydrophilic segment, and wherein the hydrophilic layer and the hydrophobic layer are alternately laminated to have a structure that exhibits a structural color by light interference, and when the hydrophilic layer absorbs water, the hydrophilic layer swells such that the structural color changes.

2. The structural color display device of claim 1, wherein the hydrophobic segment is at least one polyolefin block selected from ethylene, polypropylene, polybutene-1, polymethylpentene and polystyrene.

3. The structural color display device of claim 1, wherein the hydrophilic segment is a monomer block formed by polymerization of at least one hydrophilic monomer selected from 2-vinylpyridine, 4-vinylpyridine and polyisoprene.

4. The structural color display device of claim 1, wherein the hydrophilic layer and the hydrophobic layer are alternately laminated one or more times in the laminate, respectively, wherein the thickness of each hydrophilic layer is 100 nm to 120 nm at a relative humidity of 30%, and wherein the thickness of each hydrophobic layer is 20 nm to 40 nm, regardless of relative humidity.

5. The structural color display device of claim 4, wherein the thickness of each hydrophilic layer is 150 nm to 180 nm at a relative humidity of 80%.

6. The structural color display device of claim 1, wherein the ionic gel electrode comprises an alkali metal salt and a hydrophilic polymer.

7. The structural color display device of claim 6, wherein the alkali metal salt and hydrophilic polymer comprised in the hydrophilic layer are the same as those comprised in the ionic gel electrode.

8. The structural color display device of claim 1, wherein when incident light is white light in the structural color display device which is self-powered by triboelectricity, a reflection spectrum peak is formed at 470 nm to 500 nm at a relative humidity of 30%, and a reflection spectrum peak is formed at 580 nm to 610 nm at a relative humidity of 90%.

9. The structural color display device of claim 1, wherein when an open-circuit voltage ($V_{OC}(30)$) and a short-circuit current ($I_{SC}(30)$) at a relative humidity of 30% are compared to an open-circuit voltage ($V_{OC}(80)$) and a short-circuit current ($I_{SC}(80)$) at a relative humidity of 80%, the structural color display device which is self-powered by triboelectricity satisfies all of Condition Formulas 1) and 2) below:

$$6.8 \leq Voc(30)/Voc(80) \leq 8.6 \quad 1)$$

$$4.8 \leq Isc(30)/Isc(80) \leq 6.4. \quad 2)$$

* * * * *